(12) United States Patent
Higa

(10) Patent No.: US 11,494,247 B2
(45) Date of Patent: Nov. 8, 2022

(54) MODEL GENERATION APPARATUS, MODEL GENERATION METHOD, AND NON-TRANSITORY STORAGE MEDIUM

(71) Applicant: NEC Corporation, Tokyo (JP)

(72) Inventor: Ryota Higa, Tokyo (JP)

(73) Assignee: NEC CORPORATION, Tokyo (JP)

(*) Notice: Subject to any disclaimer, the term of this patent is extended or adjusted under 35 U.S.C. 154(b) by 65 days.

(21) Appl. No.: 17/274,276

(22) PCT Filed: Sep. 6, 2019

(86) PCT No.: PCT/JP2019/035143
§ 371 (c)(1),
(2) Date: Mar. 8, 2021

(87) PCT Pub. No.: WO2020/054599
PCT Pub. Date: Mar. 19, 2020

(65) Prior Publication Data
US 2021/0318921 A1    Oct. 14, 2021

(30) Foreign Application Priority Data
Sep. 10, 2018  (JP) .............................. JP2018-169077

(51) Int. Cl.
*G06F 11/00* (2006.01)
*G06Q 10/08* (2012.01)
*G06Q 30/06* (2012.01)

(52) U.S. Cl.
CPC ......... *G06F 11/008* (2013.01); *G06Q 10/087* (2013.01); *G06Q 30/0631* (2013.01)

(58) Field of Classification Search
CPC . G06F 11/008; G06Q 10/087; G06Q 30/0631
See application file for complete search history.

(56) References Cited

U.S. PATENT DOCUMENTS 7,539,907 B1 *  5/2009  Johnsen ............... G06F 11/008
                                                       714/26
7,945,410 B2 *  5/2011  Morioka ............... G05B 15/02
                                                       700/109
(Continued)

FOREIGN PATENT DOCUMENTS

JP    H01-278865 A    11/1989
JP    2003-050701 A    2/2003
(Continued)

OTHER PUBLICATIONS

International Search Report for PCT Application No. PCT/JP2019/035143, dated Nov. 19, 2019.
(Continued)

*Primary Examiner* — Bryce P Bonzo
*Assistant Examiner* — Matthew N Putaraksa
(74) *Attorney, Agent, or Firm* — Sughrue Mion, PLLC

(57) ABSTRACT

A model generation apparatus (2000) acquires component failure data in which a usage status is associated with a failure record of a component. The model generation apparatus (2000) generates, for each of a plurality of component groups, a prediction model for predicting the number of failures of each component included in the component group by using the component failure data relating to the component belonging to the component group. The prediction model computes a prediction value of the total number of failures of the components belonging to a corresponding component group from the usage status, and computes a prediction value of the number of failures of each component belonging to the component group from the computed prediction value of the total number of failures.

11 Claims, 10 Drawing Sheets

(56) References Cited

U.S. PATENT DOCUMENTS

| | | | |
|---|---|---|---|
| 10,091,052 B1* | 10/2018 | Corrigan | H04L 43/10 |
| 2003/0171836 A1 | 9/2003 | Tajima et al. | |
| 2004/0088991 A1* | 5/2004 | Gallant | G05B 9/03 |
| | | | 60/772 |
| 2004/0123179 A1 | 6/2004 | Dragomir-Daescu et al. | |
| 2007/0203857 A1 | 8/2007 | Hagen | |
| 2009/0313605 A1* | 12/2009 | Ostrand | G06F 11/008 |
| | | | 717/124 |
| 2010/0313072 A1* | 12/2010 | Suffern | G06F 11/0706 |
| | | | 714/E11.029 |
| 2011/0213636 A1 | 9/2011 | Sakuma | |
| 2012/0029872 A1* | 2/2012 | Kuo | G06F 11/008 |
| | | | 702/182 |
| 2018/0247256 A1* | 8/2018 | Takigawa | G06N 20/00 |
| 2020/0209841 A1* | 7/2020 | Srinivasan | H02J 3/381 |
| 2021/0381928 A1* | 12/2021 | Meis | G01M 13/00 |
| 2021/0406683 A1* | 12/2021 | Kai | G06N 3/08 |
| 2022/0050733 A1* | 2/2022 | Selvaraju | G06F 11/008 |

FOREIGN PATENT DOCUMENTS

| | | | |
|---|---|---|---|
| JP | 2003-257808 A | | 9/2003 |
| JP | 2004-295667 A | | 10/2004 |
| JP | 2010-113672 A | | 5/2010 |
| JP | 2012-155684 A | | 8/2012 |
| JP | 2013-182498 A | | 9/2013 |
| WO | 2017/163561 A1 | | 9/2017 |

OTHER PUBLICATIONS

Japanese Office Action for JP Application No. 2018-169077 dated Nov. 19, 2019 with English Translation.

Japanese Office Action for JP Application No. 2018-169077 dated Jul. 21, 2020 with English Translation.

Iizuka, Shinji et al., "Demand Forecasting of Service Parts Using Linear Regression", Hitachi Tohoku Software technical report, Nov. 21, 2011, No. 17, pp. 11-14, ISSN 1342-8217.

* cited by examiner

FIG. 5

| OBSERVATION IDENTIFIER | OBSERVATION TIME POINT | USAGE STATUS | | | | COMPONENT | | |
|---|---|---|---|---|---|---|---|---|
| | | ACTUAL OPERATING TIME | NUMBER OF STARTS | ELAPSED USAGE TIME | ... | COMPONENT A | COMPONENT B | ... |
| 0001 | t1 | a1 | b1 | c1 | ... | 0 | 0 | ... |
| 0002 | t2 | a2 | b2 | c2 | ... | 0 | 1 | ... |
| ... | ... | ... | ... | ... | ... | ... | ... | ... |

202　204　206　208　200

MODEL GENERATION APPARATUS, MODEL GENERATION METHOD, AND NON-TRANSITORY STORAGE MEDIUM

This application is a National Stage Entry of PCT/JP2019/035143 filed on Sep. 6, 2019, which claims priority from Japanese Patent Application 2018-169077 filed on Sep. 10, 2018, the contents of all of which are incorporated herein by reference, in their entirety.

TECHNICAL FIELD

The present invention relates to failure prediction.

BACKGROUND ART

A technique for predicting a failure of a component is developed. For example, Patent Document 1 discloses a technique for determining a component having a failure sign by using sensor information obtained from an operating device, and predicting the required number of components having the failure sign. Here, in Patent Document 1, a failure rate is decided in advance for an individual component, and the required number of each component is predicted by using a prediction model (Poisson distribution) based on the failure rate.

RELATED DOCUMENT

Patent Document

[Patent Document 1] Japanese Patent Application Publication No. 2010-113672

SUMMARY OF THE INVENTION

Technical Problem

In order to accurately decide a failure rate of an individual component, it is necessary to sufficiently accumulate record data relating to a failure of each component. However, in general, a large number of components do not often fail in a short period of time, so that a long time is required to accumulate the record data of the failure. Therefore, it is not possible for the technique of Patent Document 1 to accurately predict a required number without using a component which is used for a long period and for which a failure record is sufficiently accumulated.

The present invention has been made in view of the above problems, and one of the objects thereof is to provide a technique capable of accurately predicting the number of failures of components even when there is little data relating to a failure of an individual component.

Solution to Problem

The model generation apparatus of the present invention includes 1) an acquisition unit that acquires component failure data in which a usage status is associated with a failure record of a component, and 2) a prediction model generation unit that, for each of a plurality of component groups, generates a prediction model for predicting the number of failures of each component belonging to the component group by using the component failure data relating to the component belonging to the component group.

The prediction model computes a prediction value of the total number of failures of the components belonging to the corresponding component group from the usage status, and computes a prediction value of the number of failures of each component belonging to the component group from the prediction value of the computed total number of failures.

A prediction apparatus of the present invention includes 1) an acquisition unit that acquires usage status data that represents a usage status, and 2) a failure number prediction unit that computes a prediction value of the number of failures of each component by using the acquired usage status data and a prediction model for each component group.

The prediction model computes a prediction value of the total number of failures of the components belonging to the corresponding component group from the usage status, and computes a prediction value of the number of failures of each component belonging to the component group from the prediction value of the computed total number of failures.

A model generation method of the present invention is executed by a computer. The model generation method includes 1) an acquisition step of acquiring component failure data in which a usage status is associated with a failure record of a component, and 2) a prediction model generation step of, for each of a plurality of component groups, generating a prediction model for predicting the number of failures of each component belonging to the component group by using the component failure data relating to the component belonging to the component group.

The prediction model computes a prediction value of the total number of failures of the components belonging to the corresponding component group from the usage status, and computes a prediction value of the number of failures of each component belonging to the component group from the prediction value of the computed total number of failures.

The prediction method of the present invention is executed by a computer. The prediction method includes 1) an acquisition step of acquiring usage status data representing a usage status, and 2) a failure number prediction step of computing a prediction value of the number of failures of each component by using the acquired usage status data and a prediction model for each component group.

The prediction model computes a prediction value of the total number of failures of the components belonging to the corresponding component group from the usage status, and computes a prediction value of the number of failures of each component belonging to the component group from the prediction value of the computed total number of failures.

A first program of the present invention causes a computer to execute each step of the model generation method of the present invention.

A second program of the present invention causes the computer to perform each step of the prediction method of the present invention.

Advantageous Effects of Invention

According to the present invention, there is provided a technique capable of accurately predicting the number of failures of components even when there is little data relating to a failure of an individual component.

BRIEF DESCRIPTION OF THE DRAWINGS

FIG. 5 is a diagram illustrating component failure data in a table format.

DESCRIPTION OF EMBODIMENTS

Hereinafter, example embodiments of the present invention will be described with reference to the drawings. Also, the same reference symbols are attached to the same configuration elements throughout the drawings and the description thereof will not be repeated. In addition, in each block diagram, unless specific description is performed, each block represents a configuration in a functional unit rather than a configuration in a hardware unit.

First Example Embodiment

<Outline>

Figure 1:
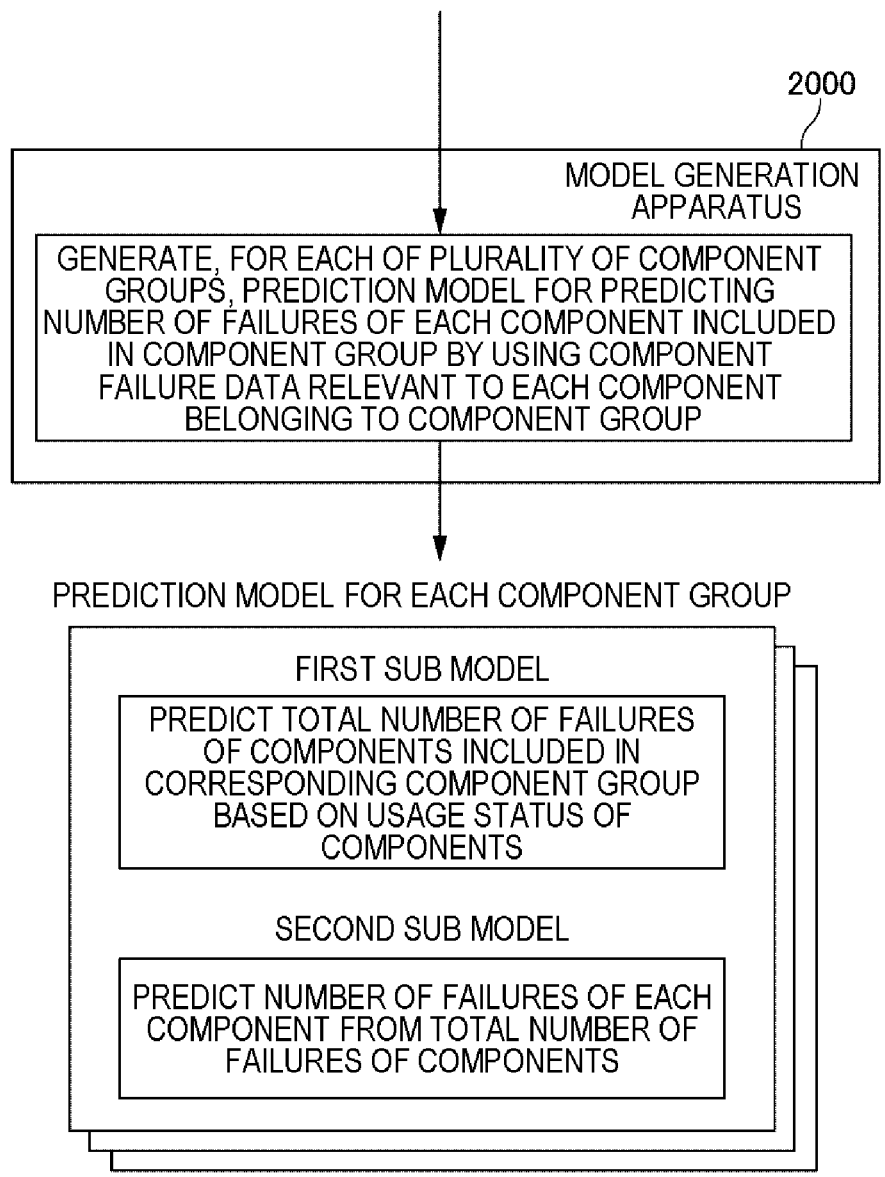
FIG. 1 is a diagram illustrating an outline of a model generation apparatus of the present example embodiment.

FIG. 1 is a diagram illustrating an outline of a model generation apparatus 2000 of the present example embodiment. The model generation apparatus 2000 generates a prediction model for predicting the number of failures according to a usage status for each of a plurality of types of components. As will be described later, prediction of the number of failures is useful to assist components ordering.

The prediction model is generated by using data (hereinafter, referred to as component failure data) in which the usage status is associated with a failure record for each of the plurality of components. Here, unless there is a fundamental problem such as a design defect, it can be said that a large number of components will not fail in a short time. For this reason, the failure data indicates that most of the components do not fail. Therefore, in a case where an attempt is made to predict the number of failures of the components based on only presence or absence of the failures of the components, it is difficult to accurately predict the number of failures until the failure record is sufficiently accumulated.

Here, the prediction model generated by the model generation apparatus 2000 does not predict the number of failures of the components based on only the failures of the components, but analyzes the failures of the components in units of component groups, thereby accurately predicting the number of failures of the components from sparse failure data. Specifically, the prediction model is generated as follows.

First, the model generation apparatus 2000 acquires the component failure data in which the usage status is associated with the failure record for each of the plurality of components. Further, the model generation apparatus 2000 generates, for each of a plurality of component groups, the prediction model for predicting the number of failures of each component included in the component group by using the component failure data relating to each component belonging to the component group.

Here, the prediction model is generated 1) to predict the total number of failures of components included in the corresponding component group based on the usage status of the components, and 2) to predict the number of failures of each component belonging to the component group based on the predicted total number of failures.

<Effect>

As described above, unless there is the fundamental problem such as the design defect, it can be said that a large number of components will not fail in a short time. However, in a case where an attempt is made to predict the number of failures of the components based on only presence or absence of the failures of the components, it is difficult to accurately predict the number of failures until the failure record is sufficiently accumulated. In this regard, according to the model generation apparatus 2000 of the present example embodiment, the prediction model is generated, for each component group, by using the component failure data relating to each component belonging to the component group. That is, the prediction model is generated after collecting data relating to the failure record of each component in units of component groups. By doing so, it is possible to increase the number of record data that can be used to generate the prediction model. For this reason, it is possible to generate the prediction model capable of accurately predicting the number of failures of components even in a situation in which the failure record is not sufficiently accumulated for an individual component.

Hereinafter, the present example embodiment will be described in further detail.

<Example of Functional Configuration>

Figure 2:
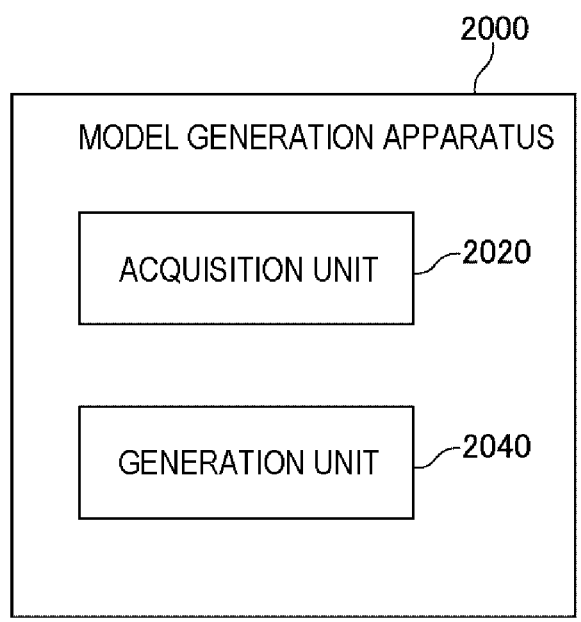
FIG. 2 is a block diagram illustrating a functional configuration of the model generation apparatus.

FIG. 2 is a block diagram illustrating a functional configuration of the model generation apparatus 2000. The model generation apparatus 2000 includes an acquisition unit 2020 and a generation unit 2040. The acquisition unit 2020 acquires the component failure data in which the usage status is associated with the failure record of the component. The generation unit 2040 generates, for each of the plurality of component groups, the prediction model for predicting the number of failures of each component included in the component group by using the component failure data relating to the components belonging to the component group.

<Example of Hardware Configuration of Model Generation Apparatus 2000>

Each functional configuration unit of the model generation apparatus 2000 may be realized by hardware that realizes each functional configuration unit (for example: a hard-wired electronic circuit, or the like) or may be realized by a combination of the hardware and software (for example: a combination of an electronic circuit and a program that controls the electronic circuit). Hereinafter, a case where each functional configuration unit of the model generation apparatus 2000 is realized by the combination of the hardware and the software will be further described.

Figure 3:
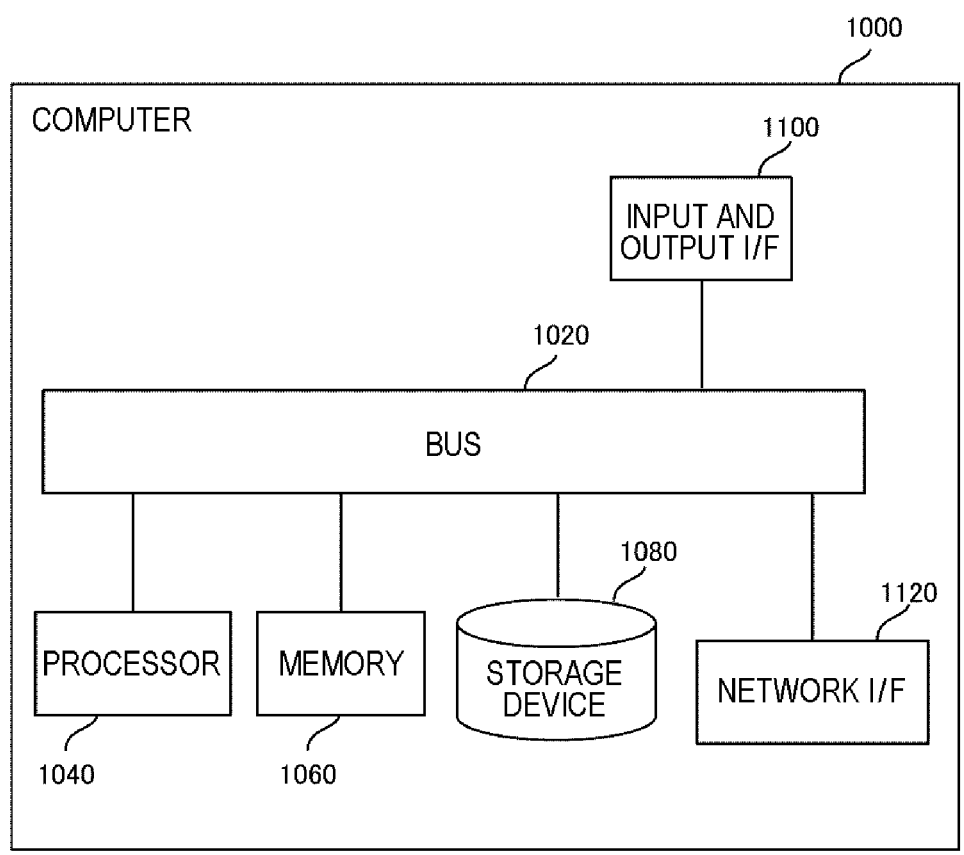
FIG. 3 is a diagram illustrating a computer for realizing the model generation apparatus.

FIG. 3 is a diagram illustrating a computer 1000 for realizing the model generation apparatus 2000. The computer 1000 is any computer. For example, the computer 1000 is a stationary computer such as a Personal Computer (PC) or a server machine. In addition, for example, the computer 1000 is a portable computer such as a smartphone or a tablet terminal. The computer 1000 may be a dedicated computer designed to realize the model generation apparatus 2000, or may be a general-purpose computer.

The computer 1000 includes a bus 1020, a processor 1040, a memory 1060, a storage device 1080, an input and output interface 1100, and a network interface 1120. The bus 1020 is a data transmission path used for the processor 1040, the memory 1060, the storage device 1080, the input and output interface 1100, and the network interface 1120 to mutually transmit and receive data. However, a method for connecting the processor 1040 and the like to each other is not limited to bus connection.

The processor 1040 includes various processors such as a Central Processing Unit (CPU), a Graphics Processing Unit (GPU), and a Field-Programmable Gate Array (FPGA). The memory 1060 is a main storage realized by using a Random Access Memory (RAM) or the like. The storage device 1080 is an auxiliary storage realized by using a hard disk, a Solid State Drive (SSD), a memory card, a Read Only Memory (ROM), or the like.

The input and output interface 1100 is an interface for connecting the computer 1000 to input and output devices. For example, an input apparatus, such as a keyboard, and an output apparatus, such as a display apparatus, are connected to the input and output interface 1100.

The network interface 1120 is an interface for connecting the computer 1000 to a communication network. The communication network includes, for example, a Local Area Network (LAN) and a Wide Area Network (WAN). A method for connecting the network interface 1120 to the communication network may be wireless connection or wired connection.

The storage device 1080 stores a program module that realizes each functional configuration unit of the model generation apparatus 2000. The processor 1040 realizes a function corresponding to each program module by reading and executing each program module in the memory 1060.

<Flow of Processing>

Figure 4:
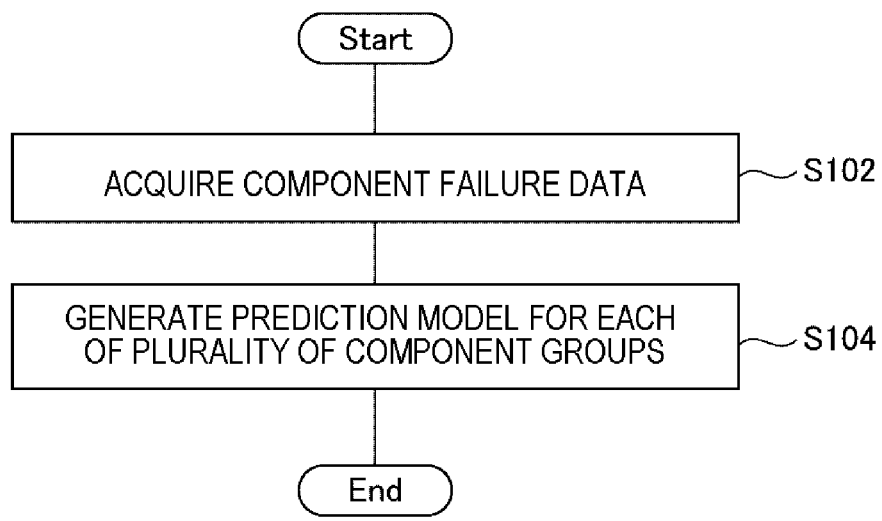
FIG. 4 is a flowchart illustrating a flow of processing executed by a model generation apparatus of a first example embodiment.

FIG. 4 is a flowchart illustrating a flow of processing executed by the model generation apparatus 2000 of a first example embodiment. The acquisition unit 2020 acquires a plurality of component failure data (S102). The generation unit 2040 generates the prediction model for each of the plurality of component groups (S104).

<Component Failure Data>

The component failure data is data in which the usage status is associated with the failure record of the component in the usage status. FIG. 5 is a diagram illustrating the component failure data in a table format. The table illustrated in FIG. 5 is referred to as a table 200. The table 200 shows an observation identifier 202, an observation time point 204, a usage status 206, and a component 208. The observation identifier 202 indicates an identifier of a corresponding record. The observation time point 204 indicates a time point at which the data shown in the corresponding record is observed. The usage status 206 indicates various pieces of information representing the usage status. For example, an example of the usage status includes actual operating time, the number of starts, elapsed usage time, and the like. The actual operating time means a total time during which an apparatus or the like including the component is actually operated, and the elapsed usage time means a total time after the apparatus or the like including the component is introduced. That is, the latter includes a time during which the apparatus or the like is not operated. The component 208 indicates presence or absence of the failure of each component. "1" indicates that the component fails and "0" indicates that the component does not fail.

The storage apparatus in which the table 200 (that is, the component failure data) is stored may be provided inside the model generation apparatus 2000 or may be provided outside the model generation apparatus 2000.

It is possible to use an existing technique as a method for recognizing the presence or absence of the failure of each component. For example, a sensor that detects the failure of the component is provided and information obtained from the sensor is used, and thus it is possible to recognize that the component fails.

Here, it is preferable that the component failure data is repeatedly generated. For example, the failure data is repeatedly generated at a frequency of once a day or once a week. Further, as in each record of the table 200 illustrated in FIG. 5, the failure data indicating the observation time point is generated.

<Acquire Component Failure Data: S102>

The acquisition unit 2020 acquires the component failure data. There are various methods for acquiring the component failure data. For example, the acquisition unit 2020 acquires the component failure data by accessing the storage apparatus in which the component failure data is stored. In addition, for example, the acquisition unit 2020 may acquire the component failure data by receiving the component failure data transmitted by another apparatus.

<Component Group>

The component group is decided in advance. For example, the component group is generated based on domain knowledge. Here, the domain knowledge is knowledge about a component that is a target of failure number prediction. More specifically, for example, the domain knowledge is, in an apparatus or the like in which each component is used, a correlation between components in a geometric structure of arrangement of each component or a correlation between components relating to an operation status. For example, for the geometric structure of the arrangement, it is expected that components arranged to be close to each other, components connected to each other, and the like have close timings at which the components fail. In addition, for the operation status, it is expected that components having the same or similar working timings have close timings at which the components fail.

For example, a decision tree that decides a component group to which a component belongs is prepared based on the domain knowledge. Further, the component group to which each component belongs is decided by using the decision tree.

<Generate Prediction Model: S106>

The generation unit 2040 generates the prediction model for each component group. As described above, the prediction model 1) predicts the total number of failures of components included in the corresponding component group based on the usage status of the components, and 2) predicts the number of failures of each component belonging to the component group based on the predicted total number of failures. Hereinafter, in the prediction model, a part that performs processing of 1) is referred to as a first sub model, and a part that performs processing of 2) is referred to as a second sub model. Hereinafter, each of the first sub model and the second sub model will be described.

<<First Sub Model>>

The generation unit 2040 generates the first sub model using the component failure data. Here, a type of the first sub model is decided in advance. It is possible to adopt any regression model, such as a linear model, a support vector machine, or a neural network, as the type of the first sub model.

The generation unit 2040 generates the first sub model by performing parameter estimation using the component failure data relating to each component belonging to the corresponding component group for the first sub model of the type decided in advance. In other words, the generation unit 2040 generates the first sub model by performing the parameter estimation based on the failure record of each component belonging to the corresponding component group and the usage status of the component for the first sub model of the type decided in advance.

For example, the type of the first sub model is decided to the linear model. In this case, the generation unit 2040 generates the first sub model by deciding a weight (parameter) of the linear model by performing multiple regression analysis based on the failure record of each component belonging to the corresponding component group and the usage status of the component. It is possible to adopt various existing methods as a specific multiple regression analysis method. For example, it is possible to use a method such as maximum likelihood estimation or Maximum a Posteriori (MAP) estimation. In addition, the parameter estimation is not limited to the point estimation, and Bayesian estimation may be used. However, in a case of adopting a method that requires prior parameter distribution as in the MAP estimation and the Bayesian estimation, the prior parameter distribution is set in advance.

Here, as an example, the maximum likelihood estimation using a least squares method will be described in detail. The first sub model in each component group is assumed as in the following Equation (1).

[Equation 1]
$$f_j(X) = \sum_i \theta_{ij} x_i \quad (1)$$

where j is an identifier of the component group and i is an identifier of the usage status.

A vector $x_i$ corresponding to each usage status i is a feature vector that describes a feature of each usage status such as the actual operating time, the number of starts, and the elapsed usage time. $\theta_{ij}$ is a weight given for the usage status i of the component group j.

The parameters of the first sub model for each component group j are obtained, for example, by solving an optimization problem formulated in the following Equation (2). That is, it is possible to obtain the parameters of the first sub model of the component group j by using a plurality of pairs of (a usage status $X_k$ and the total number $y_j(X_k)$ of failures of components in the component group j in the usage status $X_k$) and minimizing a total sum of a distance between a prediction value computed for each of the plurality of pairs and a measured value.

[Equation 2]
$$\operatorname*{argmin}_{\Theta_j} \sum_k |y_j(X_k) - f_j(X_k)|_2 + g_j(\Theta_j) \quad (2)$$

Here, $y_j(X_k)$ is the measured value of the number of failures in the usage status $X_k$ of the component belonging to the component group j (the number of failures shown in the group failure data). $f_j(X_k)$ is a prediction value of the number of failures obtained by inputting the usage status $X_k$ with respect to a first sub model $f_j(X)$ for the component group j. $\Theta_j$ is a vector representing a set of parameters $\Theta_{ij}$ included in the first sub model $f_j(X)$ of the component group j. In addition, $g_j(\Theta_j)$ is any regularization term such as an L1 regularization term and an L2 regularization term.

Here, in Equation (2), although a distance between $y_j(X)$ and $f_j(X)$ is represented by an L2 norm, it is possible to use any scale other than the L2 norm as a scale of the distance.

<<Second Sub Model>>

The second sub model predicts the number of failures of each component from the total number of failures computed for the corresponding component group. For example, the second sub model predicts the number of failures of each component by using a distribution (hereinafter, predicted distribution) of the number of failures and failure probabilities of each component decided in advance.

For example, a uniform distribution is decided as the predicted distribution of the number of failures. In this case, the second sub model computes the prediction value of the number of failures of each component by dividing the total number of failures predicted for the corresponding component group by the total number of types of the components included in the component group. In addition, for example, the uniform distribution is decided as the predicted distribution of the failure probability. In this case, the second sub model computes the prediction value of the number of failures of each component by proportionally dividing the total number of failures computed for the corresponding component group by a ratio according to the number of usage of each component. It should be noted that, the predicted distribution is not limited to the uniform distribution, and any distribution is possible.

<Output>

The model generation apparatus 2000 outputs the generated prediction model using any method. For example, the model generation apparatus 2000 stores the computed prediction model in the storage apparatus or transmits the computed prediction model to another apparatus. Here, the storage apparatus that stores the prediction model may be provided inside the model generation apparatus 2000, or may be provided outside the model generation apparatus 2000.

<Updating of Prediction Model>

The model generation apparatus 2000 may update the generated prediction model. Specifically, when the acquisition unit 2020 newly acquires the component failure data, the generation unit 2040 updates one or both of the first sub model and the second sub model using the component failure data. It should be noted that, the updating of the first sub model means updating of the parameters of the above-described linear model or the like, and the updating of the second sub model means updating of the above-described predicted distribution.

For example, the model generation apparatus 2000 periodically acquires the component failure data even after the prediction model is generated, and updates the prediction model using the acquired component failure data. It should be noted that, it is possible to use an existing technique as a technique of updating the generated prediction model using the newly obtained observation data.

Second Example Embodiment

Figure 6:
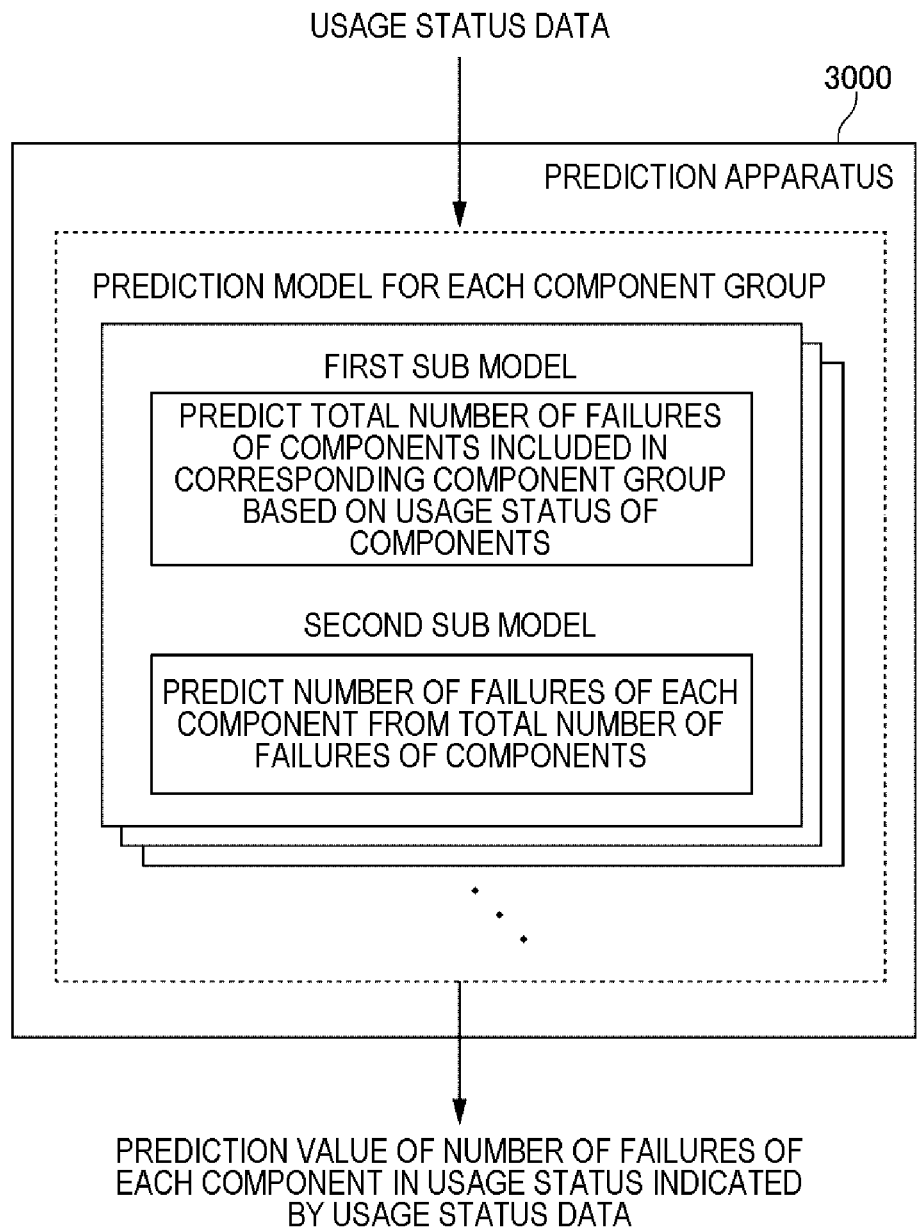
FIG. 6 is a diagram illustrating working of a prediction apparatus.

FIG. 6 is a diagram illustrating working of a prediction apparatus 3000. The prediction apparatus 3000 predicts the number of failures of each component by using the prediction model generated by the model generation apparatus

2000. Specifically, the prediction apparatus 3000 acquires usage status data representing the usage status, and computes the prediction value of the number of failures of each component in the usage status by inputting the usage status data to the prediction model.

Here, as described in the first example embodiment, the prediction model is prepared for each component group. Each prediction model computes the prediction value of the total number of failures of the components belonging to the corresponding component group from the usage status, and computes the prediction value of the number of failures of each component belonging to the component group from the prediction value of the computed total number of failures.

<Advantageous Effects>

According to the prediction apparatus 3000 of the present example embodiment, the prediction value of the number of failures of each component in a specific usage status can be obtained by using the prediction model generated by the model generation apparatus 2000. Here, as described in the first example embodiment, the model generation apparatus 2000 can generate the prediction model capable of accurately predicting the number of failures of each component even in a case where a record relating to the number of failures of an individual component is not sufficiently obtained. Therefore, with the prediction apparatus 3000 that performs the prediction using the prediction model generated by the model generation apparatus 2000, it is possible to accurately predict the number of failures of each component even in a case where the record relating to the number of failures of the individual component is not sufficiently obtained.

<Example of Functional Configuration>

Figure 7:
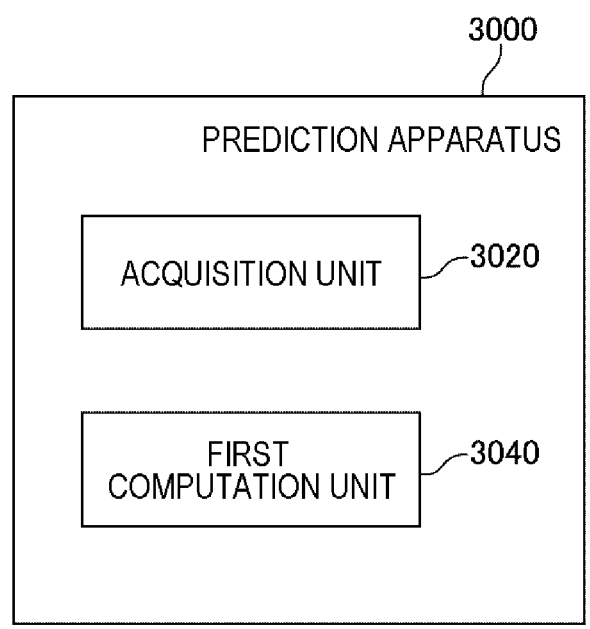
FIG. 7 is a block diagram illustrating a functional configuration of the prediction apparatus.

FIG. 7 is a block diagram illustrating a functional configuration of the prediction apparatus 3000. The prediction apparatus 3000 includes an acquisition unit 3020 and a first computation unit 3040. The acquisition unit 3020 acquires the usage status data representing the usage status. The first computation unit 3040 computes the prediction value of the number of failures of each component by using the acquired usage status data and the prediction model for each component group.

<Example of Hardware Configuration>

It is possible to adopt various hardware configurations for the hardware configuration of the prediction apparatus 3000 as in the model generation apparatus 2000 described in the first example embodiment. For example, it is possible to represent the hardware configuration of the prediction apparatus 3000 in FIG. 3 as in the hardware configuration of the model generation apparatus 2000. However, the hardware configuration of the prediction apparatus 3000 may not the same as the hardware configuration of the model generation apparatus 2000.

<Flow of Processing>

Figure 8:
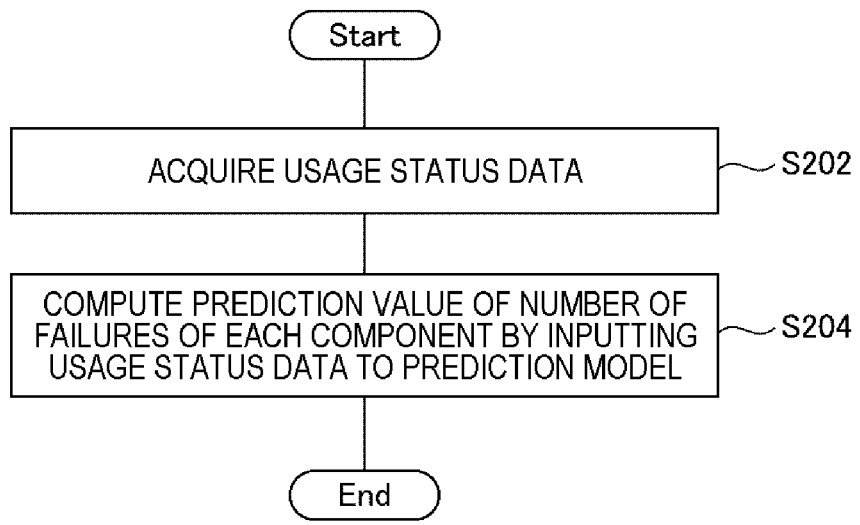
FIG. 8 is a flowchart illustrating a flow of processing executed by the prediction apparatus.

FIG. 8 is a flowchart illustrating a flow of processing executed by the prediction apparatus 3000. The acquisition unit 3020 acquires the usage status data (S202). The first computation unit 3040 computes the prediction value of the number of failures of each component by inputting the usage status data to the prediction model (S204).

<Acquire Usage Status Data: S202>

The acquisition unit 3020 acquires the usage status data. For example, the usage status data is a feature vector in which the feature of the usage status, such as the actual operating time, the number of starts, or the elapsed usage time, is described. However, the usage status data is not necessary to be in a format that can be directly input to the prediction model like the feature vector, and can be in any format. In a case where the usage status data is not the data format which can be directly input to the prediction model, the acquisition unit 3020 appropriately performs conversion on the data format.

Any method for acquiring the usage status data is used. For example, the acquisition unit 3020 acquires the usage status data by accessing the storage apparatus in which the usage status data is stored. The storage apparatus may be provided inside the prediction apparatus 3000 or may be provided outside the prediction apparatus 3000. In addition, for example, the acquisition unit 3020 may acquire the usage status data by receiving the usage status data transmitted from another apparatus.

<Predict Number of Failures: S204>

The first computation unit 3040 computes the prediction value of the number of failures of each component by inputting the usage status data to the prediction model (S204). The prediction value of the number of failures of each component is computed by inputting the usage status data with respect to each prediction model prepared for each component group. It should be noted that, the prediction model is stored in any storage apparatus accessible from the prediction apparatus 3000. The storage apparatus may be provided inside the prediction apparatus 3000 or may be provided outside the prediction apparatus 3000.

Here, the prediction of the number of failures of the components may be performed for all component groups, or may be performed only for a specific component group. In the latter case, the prediction apparatus 3000 acquires information representing a component group which is a prediction target (for example, the identifier of the component group) and inputs the usage status with respect to the prediction model corresponding to the component group determined by the acquired information, thereby computing the prediction value of the number of failures of each component belonging to the component group.

<Output Result>

The prediction apparatus 3000 outputs output information indicating the prediction value of the number of failures of each component. For example, the output information is information in which the number of failures of each component is indicated using a list or a table.

Any method for outputting the output information is used. For example, the prediction apparatus 3000 outputs the output information using a method for storing the output information in the storage apparatus, displaying the output information on the display apparatus, or transmitting the output information to another apparatus.

<Other Functions of Prediction Apparatus 3000>

Figure 9:
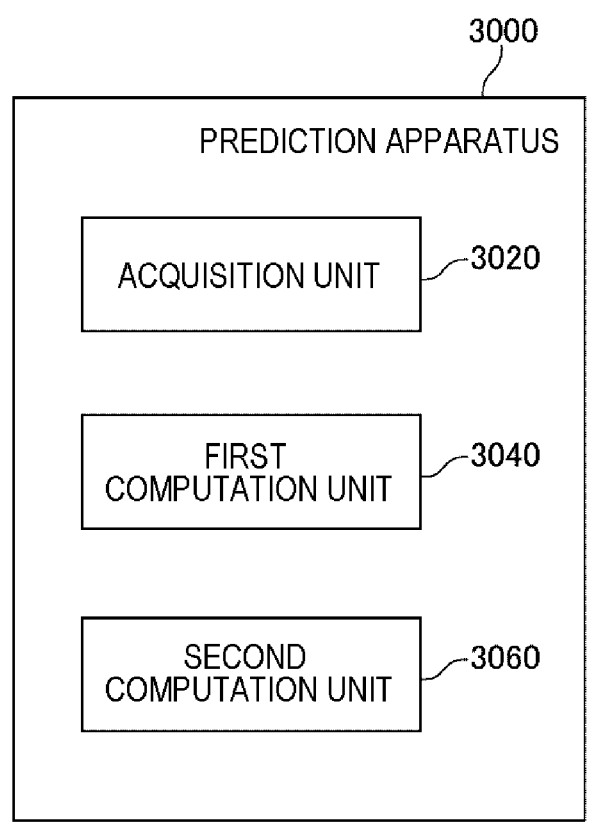
FIG. 9 is a block diagram illustrating a functional configuration of a prediction apparatus having a second computation unit.

The prediction apparatus 3000 may acquire inventory data indicating the number of inventories of each component, and may compute the recommended number of orders of each component based on the predicted number of failures for each component and the number of inventories of each component. A functional configuration unit that computes the recommended number of orders of each component is referred to as a second computation unit 3060. In addition, the inventory data is acquired by the acquisition unit 3020. FIG. 9 is a block diagram illustrating a functional configuration of a prediction apparatus 3000 having the second computation unit 3060.

Here, there are various methods for the second computation unit 3060 computing the recommended number of orders. For example, the second computation unit 3060 sets a difference between the prediction value of the number of failures of components and the number of inventories of components as the recommended number of orders of the components. In addition, for example, in consideration of securing extra inventories of the components, the second computation unit 3060 sets a value, which is obtained by adding an extra amount to the difference between the prediction value of the number of failures of the components and the number of inventories of the components, as the recommended number of orders of the components.

Here, the extra amount may be a value common to all the components, or may be decided for each component. In the latter case, for example, the prediction apparatus 3000 computes accuracy of the prediction model for each component, and increases the extra amounts as the accuracy of the prediction model is low. Here, it is possible to represent the accuracy of the prediction model using various indexes such as Root Mean Square Error (RMSE).

Figure 10:
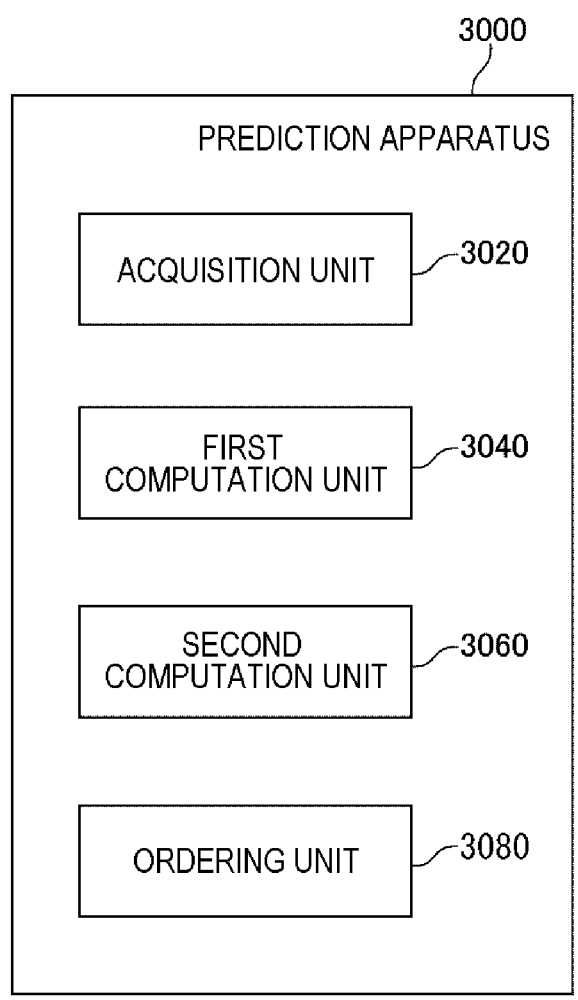
FIG. 10 is a block diagram illustrating a functional configuration of a prediction apparatus having an ordering unit.

Further, the prediction apparatus 3000 may have a function of placing an order for each component based on the recommended number of orders for the component. A functional configuration unit having the function is referred to as an ordering unit 3080. FIG. 10 is a block diagram illustrating a functional configuration of a prediction apparatus 3000 having an ordering unit 3080. It should be noted that, it is possible to use an existing technique as a technique of automatically ordering the components.

Hereinabove, although the example embodiments of the present invention are described with reference to the drawings, the example embodiments are merely examples of the present invention, and it is possible to adopt a combination of the above-described example embodiments or other various configurations.

A part or the entirety of the example embodiments may be described as in the following supplementary notes but is not limited to the following supplementary notes.

1. A model generation apparatus including
an acquisition unit that acquires component failure data in which a usage status is associated with a failure record of a component, and
a prediction model generation unit that, for each of a plurality of component groups, generates a prediction model for predicting the number of failures of each component belonging to the component group by using the component failure data relating to the component belonging to the component group,
in which the prediction model computes a prediction value of the total number of failures of the components belonging to the corresponding component group from the usage status, and computes a prediction value of the number of failures of each component belonging to the component group from the prediction value of the computed total number of failures.

2. The model generation apparatus of 1, in which
the prediction model includes a first sub model that predicts the total number of failures of the components belonging to the component group from the usage status, and
the prediction model generation unit generates, for each of the plurality of component groups, the first sub model by estimating a parameter of the first sub model by using the component failure data relating to each component belonging to the component group.

3. The model generation apparatus of 2, in which
the prediction model includes a second sub model that predicts the number of failures of each component belonging to the corresponding component group from the total number of failures predicted by the first sub model, and
the second sub model computes the prediction value of the number of failures of each component by using the predicted total number of failures and a predicted distribution which is a distribution of the number of failures or a failure rate of each component.

4. The model generation apparatus of any one of 1 to 3, in which
the plurality of component groups are generated by performing classification on a plurality of components using domain knowledge relating to a relationship between the components.

5. The model generation apparatus of 4, in which
the domain knowledge relates to a correlation between the respective components based on a geometric structure of arrangement or a correlation between the respective components based on an operation status.

6. A prediction apparatus including
an acquisition unit that acquires usage status data that represents a usage status, and
a failure number prediction unit that computes a prediction value of the number of failures of each component by using the acquired usage status data and a prediction model for each component group,
in which the prediction model computes a prediction value of the total number of failures of the components belonging to the corresponding component group from the usage status, and computes a prediction value of the number of failures of each component belonging to the component group from the prediction value of the computed total number of failures.

7. The prediction apparatus of 6, in which
the acquisition unit further acquires inventory data indicating the number of inventories of each component, the prediction apparatus further including:
an ordering number computation unit that, for each component, computes the recommended number of orders of the component based on the prediction value of the number of failures of the components computed by the failure number prediction unit and the number of inventories of the component indicated by the inventory data.

8. The prediction apparatus of 7, further including
an ordering unit that places an order for each component using the recommended number of orders computed for each component.

9. A model generation method executed by a computer, the method including
an acquisition step of acquiring component failure data in which a usage status is associated with a failure record of a component, and
a prediction model generation step of, for each of a plurality of component groups, generating a prediction model for predicting the number of failures of each component belonging to the component group by using the component failure data relating to the component belonging to the component group,
in which the prediction model computes the prediction value of the total number of failures of the components belonging to the corresponding component group from the usage status, and computes a prediction value of the number of failures of each component belonging to the component group from the prediction value of the computed total number of failures.

10. The model generation method of 9, in which
the prediction model includes a first sub model that predicts the total number of failures of the components belonging to the component group from the usage status, and
the prediction model generation step includes generating, for each of the plurality of component groups, the first sub model by estimating a parameter of the first sub model by using the component failure data relating to each component belonging to the component group.

11. The model generation method of 10, in which
the prediction model includes a second sub model that predicts the number of failures of each component belonging to the corresponding component group from the total number of failures predicted by the first sub model, and
the second sub model computes the prediction value of the number of failures of each component by using the predicted total number of failures and a predicted distribution which is a distribution of the number of failures or a failure rate of each component.

12. The model generation method of any one of 9 to 11, in which
the plurality of component groups are generated by performing classification on a plurality of components using domain knowledge relating to a relationship between the components.

13. The model generation method of 12, in which
the domain knowledge relates to a correlation between the respective components based on a geometric structure of arrangement or a correlation between the respective components based on an operation status.

14. A prediction method executed by a computer, the method including
an acquisition step of acquiring usage status data representing a usage status, and
a failure number prediction step of computing a prediction value of the number of failures of each component by using the acquired usage status data and a prediction model for each component group,
in which the prediction model computes the prediction value of the total number of failures of the components belonging to the corresponding component group from the usage status, and computes a prediction value of the number of failures of each component belonging to the component group from the prediction value of the computed total number of failures.

15. The prediction method of 14, in which
the acquisition step includes further acquiring inventory data indicating the number of inventories of each component, the prediction method further including:
an ordering number computation step of, for each component, computing the recommended number of orders of the component based on the prediction value of the number of failures of the component computed by the failure number prediction unit and the number of inventories of the component indicated by the inventory data.

16. The prediction method of 15 further including an ordering step of placing an order for each component using the recommended number of orders computed for each component.

17. A program causing a computer to execute each step of the model generation method of any one of 9 to 13.

18. A program causing a computer to execute each step of the prediction method of any one of 14 to 16.

This application claims priority based on Japanese Patent Application No. 2018-169077 filed on Sep. 10, 2018, and incorporates all of its disclosures herein.

REFERENCE SIGNS LIST

200: table
202: observation identifier
204: observation time point
206: usage status
208: component
1000: computer
1020: bus
1040: processor
1060: memory
1080: storage device
1100: input and output interface
1120: network interface
2000: model generation apparatus
2020: acquisition unit
2040: generation unit
3000: prediction apparatus
3020: acquisition unit
3040: first computation unit
3060: second computation unit
3080: ordering unit

What is claimed is:

1. A model generation apparatus comprising:
at least one memory configured to store one or more instructions; and
at least one processor configured to execute the one or more instructions to:
acquire component failure data in which a usage status is associated with a failure record of a component; and
generate, for each of a plurality of component groups a prediction model for predicting a number of failures of each component belonging to the component group by using the component failure data relating to the component belonging to the component group,
wherein the prediction model computes a prediction value of a total number of failures of the components belonging to the corresponding component group from the usage status, and computes a prediction value of the number of failures of each component belonging to the component group from the prediction value of the computed total number of failures.

2. The model generation apparatus according to claim 1, wherein the prediction model comprises a first sub model that predicts the total number of failures of the components belonging to the component group from the usage status, and
wherein the processor is further configured to execute the one or more instructions to generate for each of the plurality of component groups, the first sub model by estimating a parameter of the first sub model by using the component failure data relating to each component belonging to the component group.

3. The model generation apparatus according to claim 2, wherein
the prediction model comprises a second sub model that predicts the number of failures of each component belonging to the corresponding component group from the total number of failures predicted by the first sub model, and
the second sub model computes the prediction value of the number of failures of each component by using the predicted total number of failures and a predicted distribution which is a distribution of the number of failures or a failure rate of each component.

4. The model generation apparatus according to claim 1, wherein
the plurality of component groups are generated by performing classification on a plurality of components using domain knowledge relating to a relationship between the components.

5. The model generation apparatus according to claim 4, wherein the domain knowledge relates to a correlation between the respective components based on a geometric structure of arrangement or a correlation between the respective components based on an operation status.

6. A model generation method executed by a computer, the method comprising:

acquiring component failure data in which a usage status is associated with a failure record of a component; and generating, for each of a plurality of component groups, a prediction model for predicting a number of failures of each component belonging to the component group by using the component failure data relating to the component belonging to the component group, wherein the prediction model computes a prediction value of a total number of failures of the components belonging to the corresponding component group from the usage status, and computes a prediction value of the number of failures of each component belonging to the component group from the prediction value of the computed total number of failures.

7. The model generation method according to claim 6, wherein the prediction model comprises a first sub model that predicts the total number of failures of the components belonging to the component group from the usage status, and the computer generates, for each of the plurality of component groups, the first sub model by estimating a parameter of the first sub model by using the component failure data relating to each component belonging to the component group.

8. The model generation method according to claim 7, wherein the prediction model comprises a second sub model that predicts the number of failures of each component belonging to the corresponding component group from the total number of failures predicted by the first sub model, and the second sub model computes the prediction value of the number of failures of each component by using the predicted total number of failures and a predicted distribution which is a distribution of the number of failures or a failure rate of each component.

9. The model generation method according to claim 6, wherein the plurality of component groups are generated by performing classification on a plurality of components using domain knowledge relating to a relationship between the components.

10. The model generation method according to claim 9, wherein the domain knowledge relates to a correlation between the respective components based on a geometric structure of arrangement or a correlation between the respective components based on an operation status.

11. A non-transitory storage medium storing a program that causes a computer to execute each step of the model generation method according to claim 6.

* * * * *